Oct. 28, 1969    M. E. HEDGLIN    3,474,742
DOUGH APPLICATOR FOR BUN MOLDS
Filed March 3, 1967    5 Sheets-Sheet 2

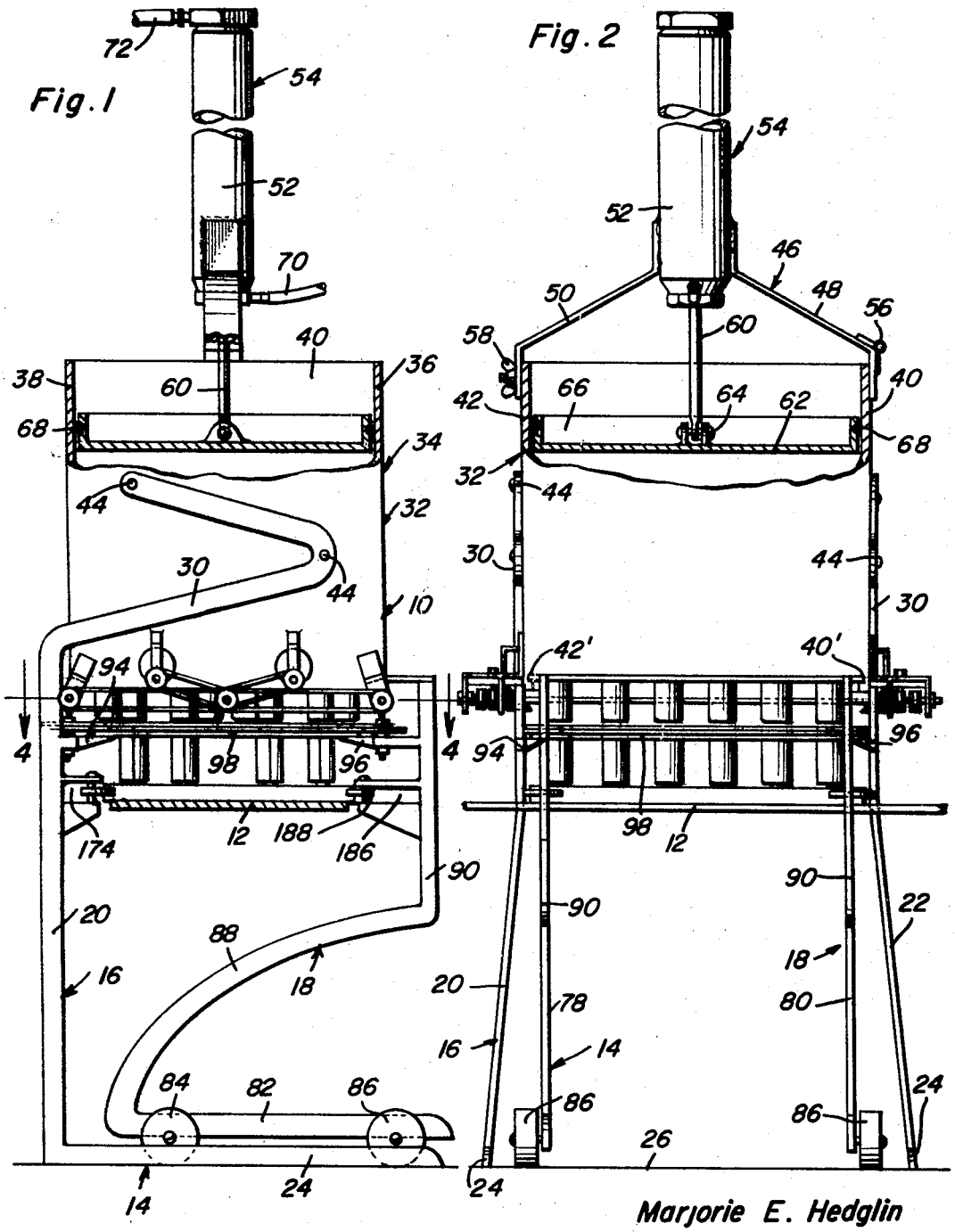

Marjorie E. Hedglin
INVENTOR.

Oct. 28, 1969  M. E. HEDGLIN  3,474,742
DOUGH APPLICATOR FOR BUN MOLDS
Filed March 3, 1967  5 Sheets-Sheet 3

Marjorie E. Hedglin
INVENTOR.

Oct. 28, 1969   M. E. HEDGLIN   3,474,742
DOUGH APPLICATOR FOR BUN MOLDS
Filed March 3, 1967   5 Sheets-Sheet 4

Marjorie E. Hedglin
INVENTOR.

Oct. 28, 1969     M. E. HEDGLIN     3,474,742
DOUGH APPLICATOR FOR BUN MOLDS
Filed March 3, 1967     5 Sheets-Sheet 5
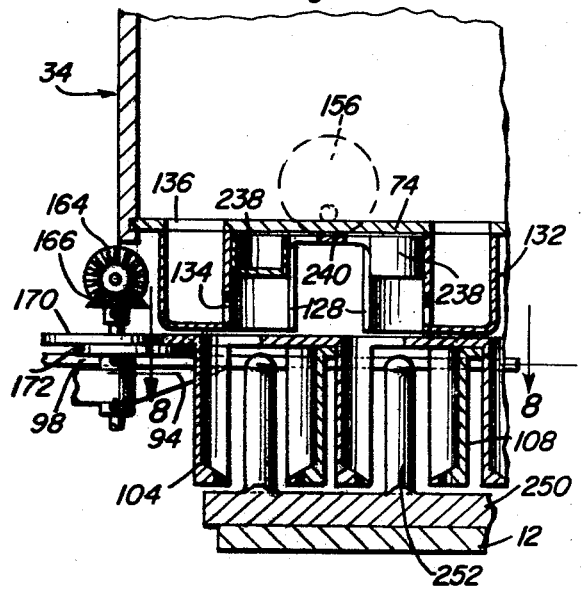
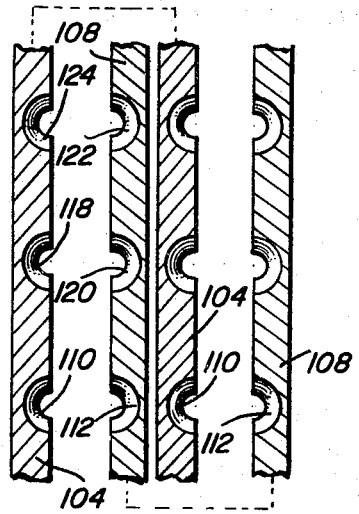
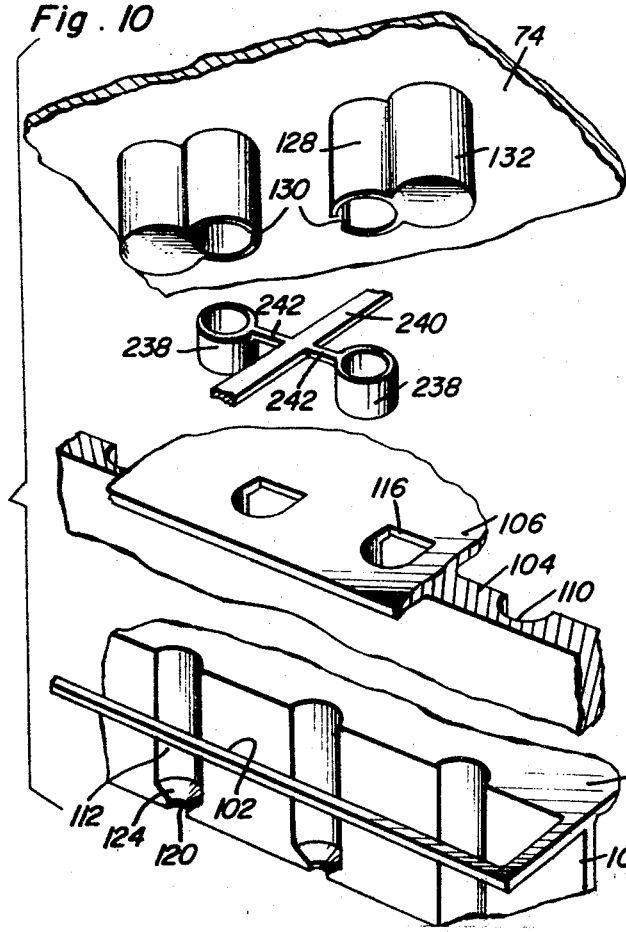
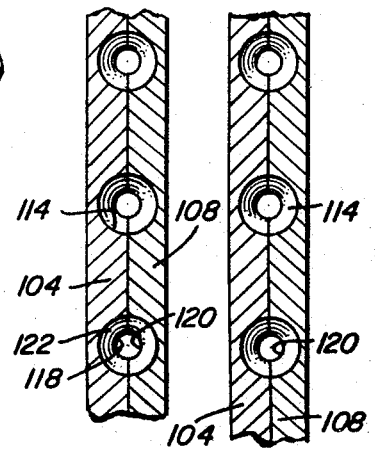
Marjorie E. Hedglin
INVENTOR.

United States Patent Office 3,474,742
Patented Oct. 28, 1969

3,474,742
DOUGH APPLICATOR FOR BUN MOLDS
Marjorie E. Hedglin, Tucson, Ariz.
(29 St. Helens, Apt. 101, Tacoma, Wash. 98402)
Filed Mar. 3, 1967, Ser. No. 620,402
Int. Cl. A21c *11/00,* A22c *7/00*
U.S. Cl. 107—1                                8 Claims

ABSTRACT OF THE DISCLOSURE

A pair of upstanding separable boundary wall members supported for general horizontal shifting toward and away from each other and defining opposing recesses which, when the wall members are shifted together, define upstanding tubular open top and open bottom mold cavities. The cavities are disposed in a row extending in a direction normal to the direction of shifting movement of the boundary wall members toward and away from each other and the wall members, when shifted away from each other, are spaced apart sufficiently for a plurality of upstanding core members having material molded thereabout when the wall members were shifted together to be removed between the wall members along the row of previously defined cavities without interference of the wall members with the upstanding core members or material molded thereon.

This invention relates to a novel and useful machine for forming hollow bun molds and the like. The machine of the instant invention includes a reservoir portion adapted to receive therein a general thixotropic food composition and further includes means for dispensing, by injection, measured quantities of the food composition at timed intervals. Further, the machine of the instant invention also includes separable mold forming members adapted to intermittently form cavities about upstanding core members positioned so that the upper ends of the cavities are registered with the food composition injection outlets of the machine. In this manner, a thixotropic food composition may be molded into predetermined shape about a core member prior to the mold members being separated and the core members, with the food composition molded thereon being removed and subjected to baking heat.

The machine of the instant invention has been specifically designed for use in the manufacture of hollow buns and the like in mass production volume at a low cost and therefore includes structural features which adapt the machine to mold the food composition about suitable core members in production line fashion.

Although the machine of the instant invention is designed for high volume production its structural components are of relatively simple design and therefore the machine is capable of extended operation with little maintenance and maintenance, when required, may be readily performed thereon.

The main object of this invention is to provide a machine capable of molding generally thixotropic food composition about supporting core members in a manner such that the core members with the food composition molded thereon may be subjected to baking temperatures and the baked food composition may then be removed from the core members so as to define hollow edible food containers such as hamburger and hot dog buns or rolls adapted to readily receive therein hamburger patties or hot dogs.

A further object of this invention, in accordance with the immediately preceding object, is to provide a machine including food composition injecting and mold forming components as well as core members for supporting the molded food composition which may be readily removed from the machine and substituted for by similar components adapted to form different shaped hollow edible food containers.

A final object of this invention to be specifically enumerated herein is to provide a machine in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an end elevational view of the machine of the instant invention with top portions thereof being broken away and illustrated in vertical sections to more clearly illustrate the means by which the food composition to be molded is pressurized for injection from the machine;

FIGURE 2 is an elevational view of the assemblage illustrated in FIGURE 1 as seen from the right side thereof;

FIGURE 7 is a fragmentary vertical sectional view similar to the left-hand portion of FIGURE 5 but illustrating the mold cavity defining a food composition injecting portions of the machine in different positions of operation;

FIGURE 8 is a fragmentary horizontal sectional view taken substantially upon the plane designated by the section line 8—8 of FIGURE 7 but with all portions of the machine other than the mold cavity defining wall members thereof removed;

FIGURE 9 is a sectional view similar to that of FIGURE 8 but illustrating the mold cavity forming wall members in different operative positions; and FIGURE 10 is an enlarged fragmentary exploded perspective view of the food composition and mold cavity forming portions of the machine.

Figure 3:
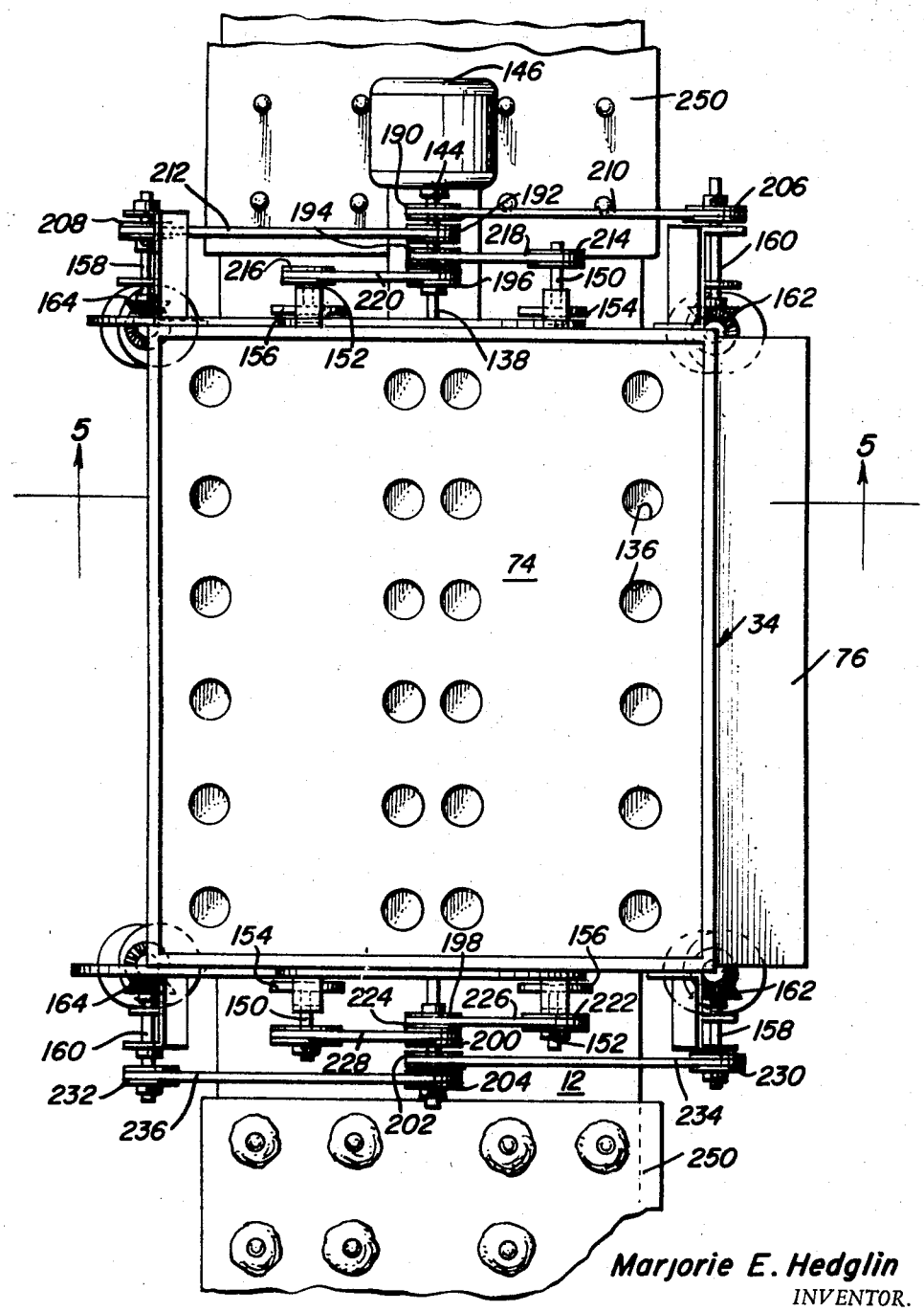
FIGURE 3 is a top plan view of the assemblage illustrated in FIGURES 1 and 2 but with the food composition pressurizing assembly of the machine removed.
Figure 4:
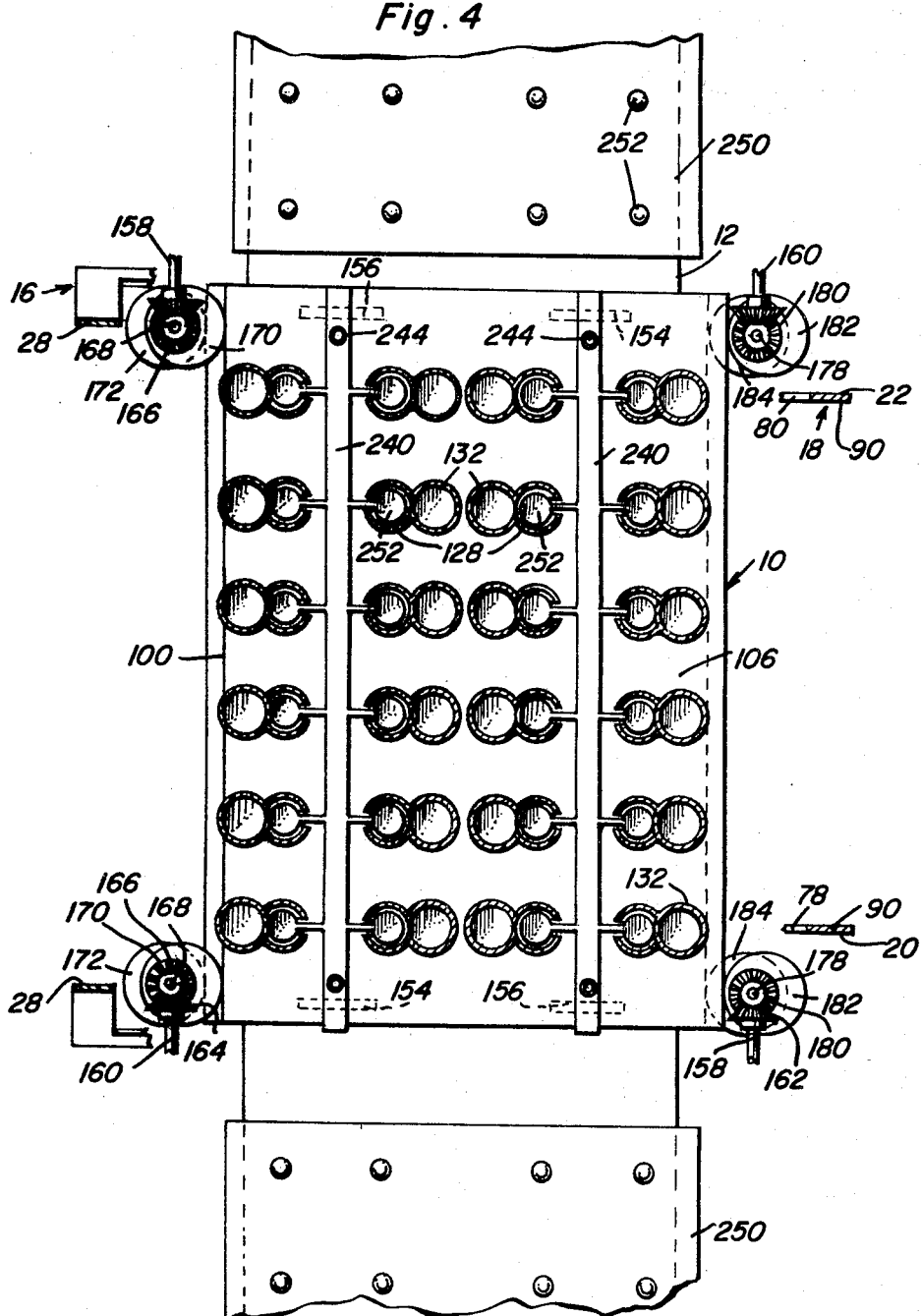
FIGURE 4 is an enlarged fragmentary horizontal sectional view taken substantially upon the plane indicated by the section line 4—4 of FIGURE 1.

Referring now more specifically to the drawings the numeral 10 generally designates the machine of the instant invention. The machine 10 is adapted to be utilized in conjunction with a horizontally movable elongated conveyor member 12 and includes frame means generally referred to by the reference numeral 14 and including frame sections generally referred to by the reference numerals 16 and 18. The frame section 16 may be considered a stationary frame section to be stationarily positioned adjacent the conveyor member 12 and includes a pair of substantially identical but right- and left-handed frame sides 20 and 22. Each of the sides 20 and 22 includes an elongated horizontal foot member 24 adapted to rest upon a supporting surface 26 beneath the conveyor member 12 and the foot members 24 terminate at corresponding ends in upstanding uprights 28 terminating at their upper ends in horizontally disposed V-shaped portions 30 adapted for disposition above the conveyor member 18.

The machine 10 includes an assembly generally referred to by the reference numeral 32 for intermittently injecting measured quantities of generally thixotropic food composition and the assembly 32 may be seen to include a reservoir generally referred to by the reference numeral 34. The reservoir 34 includes front and rear walls 36 and 38 interconnected by means of opposite end walls 40 and 42 and is supported between the V-shaped portions 30 by means of suitable fasteners 44 secured through the V-shaped portions 30 and threadedly engaged in the opposite end walls 40 and 42.

A V-shaped support structure generally referred to by the reference numeral 46 including a pair of downwardly divergent arms 48 and 50 is provided and the cylinder portion 52 of an extendable fluid motor generally referred to by the reference numeral 54 is secured between the adjacent ends of the arms 48 and 50 in any convenient manner. The end of the arm 48 remote from the cylinder portion is hingedly supported from the end wall 40 by means of a hinge construction 56 and the end of the arm 50 remote from the cylinder portion 52 is removably secured to the upper marginal edge portion of the end wall 42 by means of a threaded fastener 58.

The fluid motor 54 includes a piston rod portion 60 which is extendable relative to the cylinder portion 52 and which has a pressure plate 62 pivotally secured to its free end portion by means of a suitable pivot fastener 64. The pressure plate 62 includes upstanding peripheral wall portions 66 provided with suitable peripherally extending seal means 68 forming a relatively fluid tight seal between the pressure plate 62 and the upstanding walls 36 and 38, 40 and 42 of the reservoir 34. Of course, the fluid motor 54 is of the double-acting type and therefore has a pair of fluid supply and return lines 70 and 72 communicated with the opposite end portions of the cylinder portion 52.

The lower end portions of the rear wall 38 and the end walls 40 and 42 project slightly below the lower end of the front wall 36 and include inwardly opening grooves 38′, 40′ and 42′, see FIGURES 2 and 5. The grooves 38′, 40′ and 42′ are coplanar and the lower edge portion of the front wall 36 is coplanar with the upper extremities of the grooves 38′, 40′ and 42′.

The housing or reservoir 34 includes a bottom wall 74 which has its rear and opposite end marginal edge portions removably received in the grooves 38′, 40′ and 42′. The forward marginal edge portions of the bottom wall 74 is designated by the reference numeral 76 and projects forwardly of the front wall 36 when the bottom wall 74 is in position closing the bottom of the reservoir 34. The marginal edge portions 76 is supported from the frame section 18. The frame section 18 includes a pair of frame sections 78 and 80 which are substantially identical but right- and left-handed and each of the sections 78 and 80 includes a lower horizontal foot member 82. The foot members 82 each include a pair of opposite end wheels 84 and 86 and the ends of the foot members 82 adjacent the wheels 84 include upwardly projecting and forwardly curving portions 88 which terminate upwardly above the corresponding wheels 86 in substantially vertically disposed and upwardly projecting portions 90. The marginal edge portions 76 of the bottom wall 74 is fixedly secured to the upper end of the portion 90 and the rear wall 74 projects toward a position overlying the portions 88 of the frame section 18.

From FIGURE 1 of the drawings it may be seen that the frame section 18 may be rolled transversely of the direction of movement of the conveyor member 12 and therefore that the bottom wall 74 may be slid out of the grooves 38′, 40′ and 42′ upon movement of the frame section 18 to the right as viewed in FIGURE 1 of the drawings.

The frame sections 16 and 18 include upwardly convergent support arm structures 94 and 96 whose upper terminal ends are disposed beneath the bottom wall 74 and removably and stationarily support the opposite ends of a guide frame 98 extending between the upper end portions of the frame sections 16 and 18 below the reservoir 34. A first plate member 100 rests upon and is guided for reciprocal movement back and forth between the upper portions of the frame sections 16 and 18 and the panel member includes a plurality of elongated slots 102 in which depending wall members 104 carried by a second plate member resting upon and slidably supported from the panel member 100 are received. As will be hereinafter more fully set forth the wall members 104 extend longitudinally of the slot 102 and are reciprocal laterally through the slot 102 toward and away from corresponding depending wall members 108 carried by the panel member 100.

The wall members 104 include vertically extending laterally opening recesses 110 opening toward corresponding recesses 112 formed in the adjacent wall members 108 and the wall members 104 and 108 are shiftable relative to each other into abutting relation with the pairs of corresponding recesses 110 and 112 defining cylindrical cavities 114 which are open at their upper ends and open through openings 116 in the plate member 106 in alignment with the upper end of the recesses 110. The lower ends of the recesses 110 and 112 include diametrically reduced lower terminal end portions 118 and 120 and generally semi-conical portions 122 and 124 connecting the diametrically reduced portions 118 and 120 with the constant diameter portions of the recesses 110 and 112.

The bottom wall 74 includes a plurality of depending injecting sleeves 128 which are longitudinally slotted as at 130 and each injecting sleeve 128 includes a companion depending discharge neck 132 which opens into the lower end of the corresponding sleeve 128 by means of a communicating opening 134. The upper ends of the necks 132 are secured about outlet openings 136 formed through the bottom wall 74 and each pair of corresponding sleeves 128 and necks 132 is disposed in a row with the slot 130 of the sleeves 128 in each row opening toward the slots 130 formed in the sleeves 128 of an adjacent row. The aforementioned rows extend along paths generally paralleling the conveyor member 12 and thus extending between the walls 40 and 42. In addition, the wall members 108 and 110 also extend along paths generally paralleling the conveyor member 12.

A main drive shaft 138 is journalled beneath the reservoir 34 by means of journal supports 140 and 142 supported from the bottom wall 74. The drive shaft 138 is coupled to the output shaft 144 of an electric motor 146 supported from the bottom wall 74 by means of a support bracket 148. Further, two pairs of axially aligned cam shafts 150 and 152 are journalled from the walls 40 and 42 on opposite sides of the drive shaft 138 and the cam shafts 150 and 152 have cam lobes 154 and 156 mounted thereon. Still further, intermediate shafts 158 and 160 are journalled from diagonally opposite corners of the reservoir 34 and one pair of intermediate shafts 158 and 160 as bevel gears 162 mounted thereon while the other pair of shafts 158 and 160 have bevel gears 164 mounted thereon. The bevel gears 164 are meshed with a pair of bevel gears 166 carried by cam shaft 168 journalled from the upright 28 and the cam shafts 168 each include cam lobes 170 and 172, the cam shaft 168 disposed on the discharge side of the reservoir 34 in the direction of movement of the conveyor member 12 also including a cam lobe 174 engageable with a pivoted latching or stop member 176 supported from the corresponding upright 28.

The portions 90 of the frame section 18 rotatably journal a pair of cam shafts 178 corresponding to the cam shaft 168 and each of the shafts 178 has a bevel gear 180 and a pair of cam lobes 182 and 184 mounted thereon. In addition, the cam shaft 178 on the discharge end of the machine 10 further includes a cam lobe 186 corresponding to the cam lobe 174 and engageable with a latch member 188 pivotally supported from the associated portion 90 and corresponding to the latch member 176.

The cam lobes 170 and 182 are engageable with the rear and front end edges of the plate member 106 and the cam lobes 172 and 184 are engageable with the rear end front end edges of the plate member 100. Accordingly, it may be seen that the plate members 100 and 106 may be reciprocated relative to the bottom wall 74 by the cams 170, 172, 182 and 184 so as to shift the wall members 104 and 108 relative to each other between the position thereof illustrated in FIGURES 8 and 9 of the drawings.

The bevel gears 166 are meshed with the bevel gears 164 and the bevel gears 180 are automatically meshed with the bevel gears 162 as the portions 90 are moved toward the uprights 28 during sliding insertion of the bottom wall 74 through the channels 40' and 42' and into the rear channel 38'.

The end of the drive shaft 188 adjacent the motor 146 includes pulleys 190, 192, 194 and 196 and the remote end of the drive shaft 138 includes pulleys 198, 200, 202 and 204. The pulleys 190 and 192 are aligned with pulleys 206 and 208 carried by the intermediate shafts 158 and 160 and are drivingly connected to the pulleys 202 and 208 by means of endless flexible belts 210 and 212. Further, the pulleys 194 and 196 are aligned with pulleys 214 and 216 carried by the cam shafts 150 and 152 of the adjacent end of the reservoir 34 and drivingly coupled thereto by means of endless flexible belts 218 and 220. Further, the pulleys 198 and 200 are aligned with pulleys 222 and 224 carried by the cam shaft 150 and 152 supported from the end of the reservoir 34 remote from the motor 146 and are drivingly coupled thereto by means of endless flexible belts 226 and 228. Finally, the pulleys 202 and 204 are aligned with pulleys 230 and 232 carried by the intermediate shafts 158 and 160 at the adjacent end of the reservoir 34 and are drivingly coupled thereto by means of endless belts 234 and 236.

In this manner, the electric motor 146 drives the cam shafts 150 and 152 as well as all four cam shafts 168 and 178 when the frame section 18 is disposed in an operative position illustrated in FIGURE 1 of the drawings with the bevel gears 180 meshed with the bevel gears 162.

Of course, the bottom wall 74 cannot be removed from the bottom of the reservoir 34 until the various endless belts have been disconnected.

Figure 5:
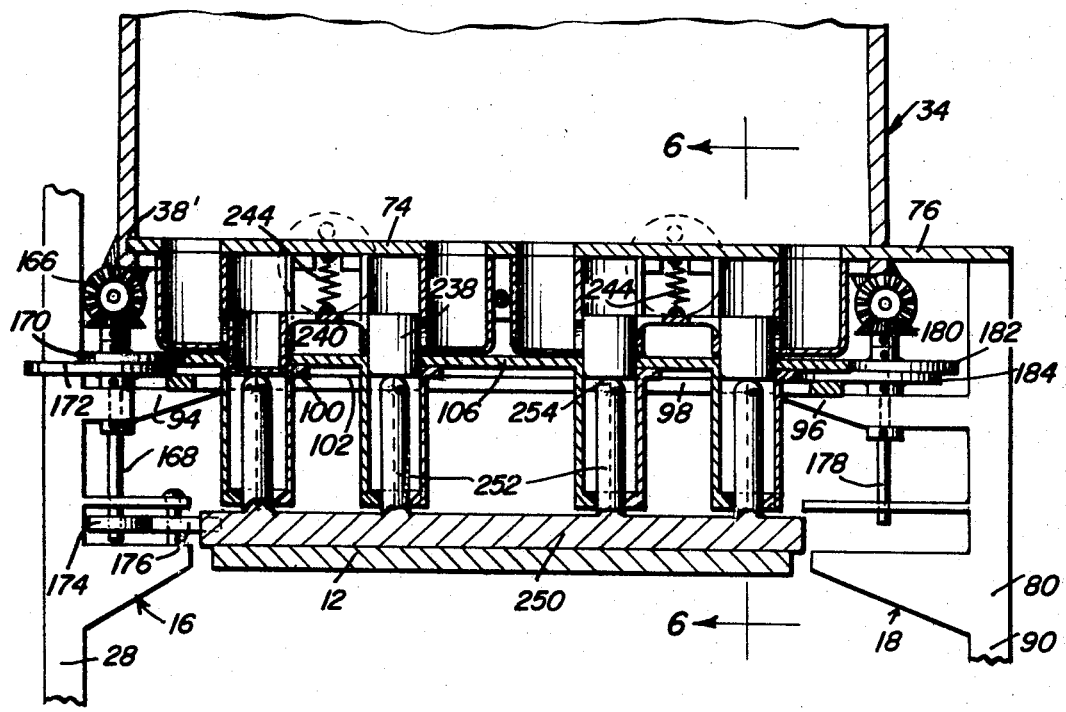
FIGURE 5 is a fragmentary enlarged vertical sectional view taken substantially upon the plane indicated by the section line 5—5 of FIGURE 3.

With attention now invited more specifically to FIGURES 5, 7 and 10, it may be seen that each pair of adjacent injection sleeves 128 in adjacent rows has a pair of cup-shaped injecting pistons 238 disposed therein supported on opposite sides of an actuating bar 240 extending therebetween by means of lateral support arms 242 carried by the support bar 240. The support arms 242 are slidably received through the corresponding pair of slots 130 and it will of course be noted that each support bar 240 includes a plurality of pairs of injecting pistons 238. The opposite ends of the support bar 240 are supported from the bottom wall 74 by means of expansion springs 244 and are engaged by the corresponding cam carried by the associated cam shafts 150 and 152. There are of course two support bars 140 and each support bar 240 includes a plurality of pairs of injection pistons 238.

A plurality of intermittently used base plate or trays 250 are provided and each of the base plates 250 includes a plurality of rows of spaced upstanding core members 252 rounded at their upper ends as at 254. The core members may be secured to the base plate or tray 250 in any convenient manner and the base plates or trays 250 are adapted to be supported from the conveyor member 12 with the upper surface of each base plate or tray 250 vertically registered with the reservoir 34 spaced slightly beneath the lower ends of the wall members 104 and 108.

The diametrically reduced portions 118 and 120 of the recesses 110 and 112 are adapted to snugly embrace the lower terminal ends of the core members 252. Further, the base plates or trays 250 are engageable by the latch members 176 and 188 upon their actuation by the cams or cam members 174 and 186.

Figure 6:
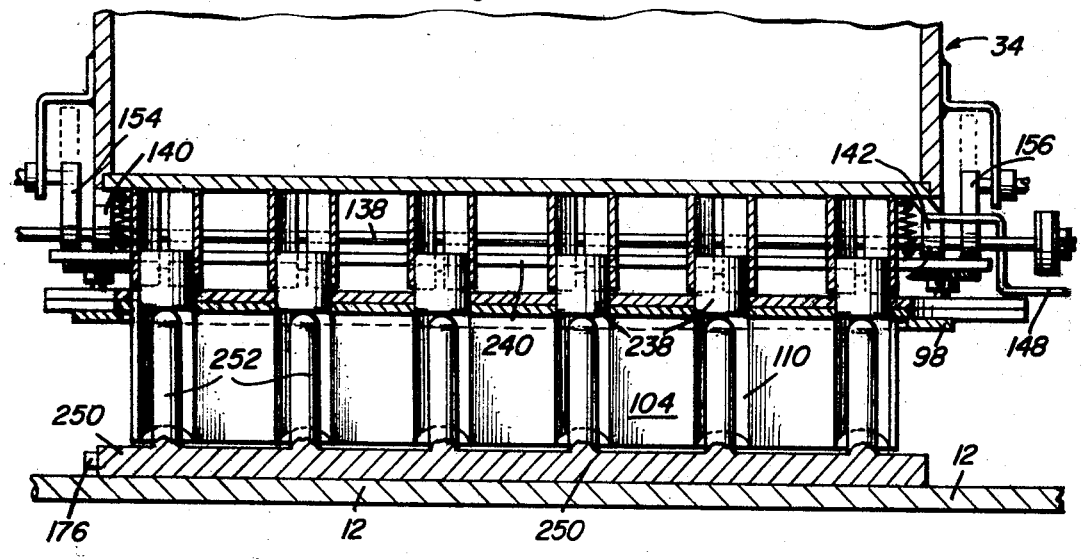
FIGURE 6 is a fragmentary vertical sectional view taken substantially upon the plane indicated by the section line 6—6 of FIGURE 5.

In operation, the conveyor member 12 is operable to move longitudinally from right to left as viewed in FIGURE 2 of the drawings and a base panel or tray 250 disposed thereon, upon operation of the motor 146 is caught and retained in the position illustrated in FIGURES 5 and 6 by the latch members 176 and 188. Thereafter, the wall members 104 and 108 are shifted from the relative position thereof illustrated in FIGURE 8 of the drawings to the position thereof illustrated in FIGURE 9 of the drawings by the cam lobes 170, 172, 182 and 184 in order that the lower terminal ends of the upstanding core members 152 are tightly embraced between the diametrically reduced portions 118 and 120 of the cavities 110 and 112. Then, the cams 154 and 156, also operated by the motor 146, urge the opposite end portions of the support bars 240 downwardly whereby the injection pistons 238 will inject the generally thixotropic food composition from within the lower ends of the injection sleeves 128 down into the open upper ends of the cavities 114 defined between each pair of confronting recesses 110 and 112. The food composition within the reservoir 34 is ejected from the discharge neck 132 through the openings 134 and into the injection sleeves 128 prior to downward movement of the injection pistons 238 by means of downward movement of the pressure wall 66 effected by the fluid motor 54. Injection of the thixotropic food composition into the cavities 114 will cause the latter to be substantially filled with the food composition and continued operation of the motor 146 will cause sufficient movement of the cams 154 and 156 to enable the springs 244 to lift the support bars 240 whereby the injection pistons 238 will be withdrawn from positions projecting through the openings 116 and the slots 102. Thereafter, continued operation of the motor 146 will cause the cams 170, 172 and 182 and 184 to shift the plate members 100 and 106 relative to each other in a manner displacing the confronting wall members 104, from the positions thereof illustrated in FIGURE 9 of the drawings to the positions thereof illustrated in FIGURE 8 of the drawings.

Movement of the wall members 104 and 108 from the positions illustrated in FIGURE 9 to the positions illustrated in FIGURE 8 will of course separate the mold cavity defining recesses 110 and 112 and thus will leave the molded thixotropic food composition on the core members 252. This food composition, supported from the base plate or tray 250 may then be released from engagement by the latch member 176 and 188 for movement toward a discharge point of the conveyor member 12. Thereafter, the base plate or tray 250 may be disposed within an oven so as to bake the food composition supported from the core members 252. The resultant food product will of course be an elongated roll having the approximate dimensions of a hot dog roll and which will be opened on at least its lower end, the food composition having a tendency to rise sufficiently so as to fully close over the upper ends of the core member 252 during the baking process.

It is also contemplated that the panel members 100 and 106 as well as the bottom wall 74 and associated injecting structure may be substituted for by similar but slightly modified components so as to adapt the machine 10 to form molded thixotropic food composition which, when baked, will more closely resemble a barbecue or hamburger roll rather than a hot dog roll. Further, other shapes of rolls or buns that are hollow may be readily formed by using especially shaped injecting and molding components.

What is claimed as new is as follows:

1. The method of forming a baked hollow edible food container comprising the steps of forming an upstanding tubular boundary wall about an upstanding core member supported from a base portion adapted to be received in an oven and with said tubular boundary wall terminating at its lower extremity closely adjacent said base portion and at its upper extremity at an elevation spaced above the upper end of said core member, injecting a generally thixotropic food composition into the top of the area about said core member bounded by said boundary wall to a level above the upper end of said core member, removing said boundary wall from about said food composition, then subjecting of said food composition to baking heat while still on said core member, and removing the baked food composition from said core member.

2. A machine for forming hollow edible food containers to be baked, said machine comprising frame means, pairs of coacting, upstanding and separable boundary wall members, means supporting said wall members from said frame for general horizontal shifting of said wall members toward and away from each other while in upstanding position and defining opposing recesses which, when said wall members are shifted together, define upstanding tubular open top and open bottom mold cavity means, food composition injecting means registered with the upper end of said mold cavity means, and base means including upstanding core member means and positionable closely beneath said boundary wall members with the core member means projecting upwardly into said cavity means and terminating upwardly at a level a spaced distance below the top of said cavity means, said injecting means being operable to inject a generally thixotropic food composition downwardly into said mold cavity means about said core member means to a level above the top of said core member means, said means supporting said wall members from said frame including means supporting said separable wall members for shifting generally horizontally apart, after said mold cavity has had said food composition injected therein, a distance sufficient to enable said core member means, with the molded food composition thereon, to move horizontally from between and without said food composition contacting said wall members.

3. The combination of claim 2 wherein said wall member, when shifted toward each other, define a row of upstanding mold cavities spaced along a path extending at generally right angles to the paths of relative movement of said wall member, said base means including a row of upstanding core members spaced along said path, said machine including support means operable to support said base means beneath said mold cavities for intermittent movement along said path when said wall members are spaced apart, and said injecting means including a row of injecting outlets registered with said row of cavities.

4. The combination of claim 3 wherein said wall members define a plurality of laterally spaced rows of cavities, said base means includes a plurality of laterally spaced rows of core members registrable with said rows of cavities, and said injecting means define a plurality of laterally spaced rows of injecting outlets registered with said rows of cavities.

5. The combination of claim 2 wherein said wall members, when shifted toward each other, define a row of upstanding mold cavities spaced along a path extending at generally right angles to the paths of relative movement of said members, said base means including a row of upstanding core members spaced along said path, said machine including support means operable to support said base means beneath said mold cavities for intermittent movement along said path when said mold members are spaced apart, and said injecting means including a row of injecting outlets registered with said row of cavities, said base means being adapted to be supported upon a generally horizontal conveyor for movement along said paths, said machine including base means engaging means shiftable between operative and inoperative positions and operable, when in said operative positions, to engage and stop said base means in position with said core members in position to be centered in said cavities upon movement of said wall means together.

6. The combination of claim 5 wherein said machine includes motor means drivingly connected to said wall members and said injecting means operative to sequentially, after said core members are properly positioned, shift said wall members together to form said cavities about said core members, actuate said injecting means to inject said food composition down into the top of said cavities about said core members, and then move said wall members apart prior to said base means and said core members with said composition thereon being removed and subjected to baking heat.

7. The combination of claim 2 wherein said machine includes motor means drivingly connected to said wall members and said injecting means operative to sequentially, after said core member means is in position, shift said wall members together to form said cavity means about said core member means, actuate said injecting means to inject said food composition down into the top of said cavity means, and then move said wall members apart prior to said base means and said core member means with said composition thereon being removed and subjected to baking heat.

8. A machine for forming hollow edible food containers to be baked, said machine comprising frame means, separable boundary wall members supported from said frame for general horizontal movement toward and away from each other and defining opposing recesses which when said wall members are moved together, define upstanding tubular open top and open bottom mold cavity means, food composition injecting means registered with the upper end of said mold cavity means, and base means including upstanding core member means and positionable closely beneath said mold cavity means with the core member means projecting upwardly into said cavity means, said injecting means being operable to inject a generally thixotropic food composition downwardly into said mold cavity means about said core member means, said machine including motor means drivingly connected to said wall members and said injecting means operative to sequentially, after said core member means is in position, shift said wall members together to form said cavity means about said core members means, actuate said injecting means to inject said food composition down into the top of said cavity means, and then move said wall members apart prior to said base means and said core member means with said composition thereon being removed and subjected to baking heat.

References Cited
UNITED STATES PATENTS

| | | | |
|---|---|---|---|
| 1,139,037 | 5/1915 | Huth | 99—427 |
| 1,984,027 | 12/1934 | Lyons. | |
| 2,585,000 | 2/1952 | Friddell | 107—66 |
| 2,674,958 | 4/1954 | Puls. | |
| 1,150,625 | 8/1915 | Roberts | 107—58 |

EDWARD L. ROBERTS, Primary Examiner

U.S. Cl. X.R.

99—442, 478; 107—4, 58